(12) United States Patent
Dultz et al.

(10) Patent No.: US 7,050,213 B2
(45) Date of Patent: May 23, 2006

(54) METHOD AND DEVICE FOR ATTENUATING LIGHT AS A FUNCTION OF INTENSITY

(75) Inventors: Wolfgang Dultz, Frankfurt am Main (DE); Leonid Beresnev, Columbia, MD (US); Galina Patrusheva, Columbia, MD (US)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 10/479,325

(22) PCT Filed: May 8, 2002

(86) PCT No.: PCT/DE02/01658

§ 371 (c)(1),
(2), (4) Date: Apr. 28, 2004

(87) PCT Pub. No.: WO02/097514

PCT Pub. Date: Dec. 5, 2002

(65) Prior Publication Data

US 2004/0169925 A1    Sep. 2, 2004

(30) Foreign Application Priority Data

May 20, 2001  (DE)  ................................ 101 25 779

(51) Int. Cl.
*G02F 1/03* (2006.01)
*G02F 1/07* (2006.01)
(52) U.S. Cl. .................... 359/246; 359/279; 359/237
(58) Field of Classification Search ................ 359/237, 359/245–247, 298, 290–291, 279, 256, 324, 359/280–281, 484, 22, 246
See application file for complete search history.

(56) References Cited

U.S. PATENT DOCUMENTS

| 6,137,636 A | 10/2000 | Smith |
| 6,366,402 B1 * | 4/2002 | Li ............................. 359/484 |

FOREIGN PATENT DOCUMENTS

| DE | 196 16 323 | 10/1997 |
| DE | 197 31 135 | 2/1999 |
| EP | 0 997 767 | 5/2000 |
| WO | WO 00 36462 | 6/2000 |

* cited by examiner

*Primary Examiner*—Jordan M. Schwartz
*Assistant Examiner*—Jessica Stultz
(74) *Attorney, Agent, or Firm*—Kenyon & Kenyon

(57) ABSTRACT

An intensity-dependent light modulating device involves a light successively passing through a polarizer, a first phase retardation plate and a first light modulator. The light then strikes a mirror and passes one again through the light modulator and the phase retardation plate in the opposite direction. The light then strikes an analyzer that is crossed relative to the polarizer. The light modulator and the phase retardation plate are respectively located in an electric field in which the indicatrices of the light modulator and the phase retardation plate are deflected, the deflection of the indicatrix of the light modulator being intensity-dependent. Due to the passage of light through the phase retardation plate and the light modulator, an intensity-dependent rotation of the direction of polarization occurs in such a way that higher intensity light is filtered in the analyzer while lower intensity light is transmitted.

17 Claims, 6 Drawing Sheets

METHOD AND DEVICE FOR ATTENUATING LIGHT AS A FUNCTION OF INTENSITY

FIELD OF THE INVENTION

The present invention relates to a method and a device for attenuating light as a function of intensity. The present invention further relates to using a polarizer, which allows light that is linearly polarized in an input polarization direction to pass through, and an analyzer crossing the same by a substantial number of degrees (or by a substantial angle) or by 90 degrees.

BACKGROUND OF THE INVENTION

In the same way as the human eye, light sensors, such as video cameras and CCDs, are only able to effectively process light up to a certain intensity. Very intense light sources, such as the sun, lightning bolts, or powerful artificial lamps dazzle the eye or produce glare for the light sensor. At too high of a light intensity, overloading of the eye or of the light sensor can result in irreparable damage or destruction.

For the human eye, this not only means that within the image of the powerful light source only a super-bright shine is still visible and not any structures, but also that the image is swamped out or blanketed by the shine in an entire surrounding area.

These effects are not desired in welding work, where the welding flame swamps out, distorts or diffuses details of the weld. They can also be harmful to pilots and soldiers, for example, who are blinded by the sun, stun grenades or muzzle flashes and, consequently, are no longer able to follow the events taking place. Video cameras are also dazzled or blinded and, in fact, often to a much greater extent than the human eye. A reason for this is that the dynamic range of video cameras is smaller than that of the human eye. And, when CCDs (charge-coupled devices) are used, one also encounters the disturbing effect that pixels, illuminated with too high of a light intensity, tend to "overflow". In other words, i.e., adjacent pixels are able to register an intensity far greater than that actually incident on them, thereby resulting in considerable imperfections in the image.

The eye has a natural intensity-dependent attenuation device, namely the iris, which protects the eye at a high light intensity by narrowing the pupil. Cameras and other light sensors can also be equipped with an intensity-dependent attenuation device, e.g., with an adjustable diaphragm. Another attenuation possibility provides for connecting filters in series, e.g., a pair of polarization filters, which are rotated with respect to one another by a specific intensity-dependent angle.

A disadvantage of attenuation devices of this kind arises from their inertia. In such, an effective glare protection, for example, against rapidly lighting-up or flashing bright light sources, such as lightning bolts, is not provided.

A further drawback of attenuation devices of this kind is that they only attenuate the light integrally, i.e., the entire field-of-view is uniformly darkened by a specific factor, so that bright zones and darker zones of the field-of-view are darkened by the same factor. This can mean that, to prevent a bright zone of the field-of-view, such as the sun, from blinding the viewer or the light sensor, the field-of-view must be darkened or dimmed to the point where nothing more is recognizable in darker zones of the field-of-view. In photography, this effect is termed the "against-the-light effect".

For that reason, special attenuation devices have been developed which do not reduce the integral light intensity, but rather darken the field-of-view only locally, where high-intensity light actually falls, while the remaining zones are not darkened or are only slightly darkened. If the field-of-view includes the sun, for example, and the sky surrounding it, then, using such a special attenuation device, only the sun itself is substantially darkened, not, however, the sky, so that there is no more "against-the-light effect". Such special attenuation devices are implemented with the aid of optically addressable, spatially resolving light modulators (OASLM).

A light modulator (OASLM) of this kind includes a birefringent layer, whose indicatrix rotates out of a rest-position direction by a specific angle in response to the application of an external electric field to the layer. It is assumed here that the magnitude of the electric field strength is E. The electric field is generated by applying a voltage to a plate capacitor, between whose plates the light modulator (OASLM) is located.

The polarity of the electric field is given by the polarity of the voltage. For that reason, the magnitude of the electric field strength can be +E or −E. The direction of rotation of the indicatrix out of its rest-position direction is dependent on the polarity of the electric field (+E or −E) and reverses when the polarity of the field-generating voltage is reversed. For one polarity reversal, however, the magnitude of the rotation remains unchanged.

The magnitude of the rotation depends not only on the electric field strength, but, in particular, also on the intensity of the light passing through the birefringent layer: the magnitude of the angle of rotation increases with the light intensity, however, at a given field strength, a specific maximum angle of rotation, referred to in the following as maximum angle, not being exceeded in response to further increasing light intensity. The maximum angle is dependent on the field strength. Therefore, the direction of the indicatrix is only the same over the entire surface of the light modulator when the light intensity is also uniformly distributed over this surface. Otherwise, zones having a differently directed indicatrix form in the light modulator; in zones of very great light intensity, it rotates by approximately the maximum angle, while in zones of low light intensity, only by small amounts as compared to the rest-position direction.

German Application No. DE-OS 196 16 323 A1 refers to utilizing this effect to manufacture an attenuation device that darkens the field-of-view locally, only where high-intensity light actually falls. Here, one takes advantage of the fact that the polarization direction of linearly polarized light, which passes through a λ/2 plate, is inverted with respect to the indicatrix of the birefringent material. For that reason, the thickness of the birefringent layer of the light modulator is selected in such a way as to enable the light modulator to act as a λ/2 plate. The strength of electric field E is selected so as to enable a maximum angle of 45° to be attained.

A polarizer is positioned upstream from the light modulator in such a way that the polarization direction of the light transmitted by passing through the polarizer forms an angle of 45° with the rest-position direction. In addition, an analyzer is placed downstream from the light modulator. It is situated so as to be crossed with respect to the polarizer by 90°.

An optical system is used to image a field-of-view onto the light modulator that contains, for example, a very bright light source against a dark background. Therefore, a bright spot, namely the image of the bright light source, and a dark zone, namely the image of the background, are formed on the light modulator.

The electric field E is only able to rotate the indicatrix of the light modulator in the area of the bright spot by the maximum angle, i.e., by 45°, out of the rest-position direction. Therefore, in the area of the bright spot, depending on the polarity of the electric field (+E or −E), the indicatrix is either at an angle of 0° or at an angle of 90° to the direction of polarization of the light that is incident on the polarizer.

As mentioned above, when passing through a $\lambda/2$ plate, the polarization direction is inverted with respect to the direction of the indicatrix. Since, in the area of the bright spot, the angle between the polarization direction of the incident light and the indicatrix is 0° or 90°, the polarization direction, in response to the inversion, either passes into itself or is rotated by 180°, so that the only light leaving the bright spot is light whose polarization is rotated with respect to the input polarization either not at all (0°) or by 180°. In both cases, i.e., for every polarity of the electric field (+E or −E), the analyzer, which is crossed relatively thereto, performs a filtering-out function, so that the image of the bright light source is completely suppressed.

Another situation arises for the dark background. The electric field (+E or −E) is only able to rotate the indicatrix of the light modulator in the area of the dark zone by a small angle out of the rest-position direction. In the area of the dark zone, the indicatrix forms an angle with the input polarization that, in each instance, varies only slightly from 45° for both polarities of the electric field (+E or −E). Therefore, as a result of the inversion with respect to the direction of the indicatrix, the input polarization is rotated by approximately twice this angle, thus by approximately 90°. The analyzer allows this polarization direction to pass through, so that the image of the dark background can be viewed with almost undiminished intensity.

Since the birefringent material of the light modulator is a liquid crystal, e.g., a nematic or smectic liquid crystal, an electrolysis, thus an electrochemical decomposition of the material, begins in response to the application of an electric field. To prevent this, instead of a constant field (+E or −E), an alternating field is applied by continually reversing the polarity of the field strength using a specific operating frequency of between +E and −E.

To the extent possible, the field strength preferably has a square-wave characteristic, so that it alternates between constant values +E and −E, the transition times preferably being kept as short as possible. As mentioned above, both for the two polarities of the electric field, i.e., both for +E as well as for −E, the above system also has the effect of suppressing the bright light source, not, however, the dark background. In this connection, the indicatrix in the area of the bright spot rotates with the operating frequency, with respect to the rest-position direction, back and forth between the positive and the negative maximum angle, which is equivalent in terms of absolute value (here ±45°).

The rotation of the molecules or molecular parts of the liquid crystal, whose orientation is decisive for the direction of the indicatrix, is encumbered, however, with relatively substantial inertia for all liquid crystals that can be used to attain large maximum angles of 45°. This means that the indicatrix exhibits a relatively long response time to change of light. Typical values may be approximately $1/100$ seconds. Light sources that light up suddenly, such as lightning bolts, can, therefore, not be suppressed quickly enough to prevent dazzling of the eye or glare for the sensor.

In response to every polarity reversal of the electric field, the light-attenuating effect is temporarily lost, since the polarity reversal causes the indicatrix to also pass through the rest-position direction in the area of the bright spot. For that reason, a long response time entails the further disadvantage that, following each polarity reversal of the electric field, a relatively long time passes until the light-attenuating effect is achieved again.

The German Patent Application No. DE-OS 196 16 323 A1 refers to an attenuation device that can do without a maximum angle of 45° because two light modulators are arranged in series. Nevertheless, in this configuration as well, relatively large maximum angles are necessary, so that there is also the drawback here that only liquid crystals having a relatively slow response time are able to be used.

However, there are a number of types of liquid crystals whose indicatrix has a very short response time to change of light. Using these liquid crystals, it is not possible, however, to achieve maximum angles large enough to be used in the systems proposed by the German Application No. DE-OS 196 16 323 A1.

A further drawback of the mentioned attenuation devices is that only one polarization direction of the incident light is utilized, while the other polarization direction is filtered out at the input polarizer.

SUMMARY OF THE INVENTION

Embodiments of the present invention are directed to devising an attenuation device which makes do with just one light modulator, which permits the use of liquid crystals whose indicatrices have a very short response time to change of light, which enables bright light sources to be completely suppressed, even when working with a small maximum angle, and which is capable of utilizing both polarization directions of the incident light.

Embodiments of the present invention are directed to an intensity-dependent attenuation device for light, having a polarizer, which allows linearly polarized light to propagate through in one input polarization direction, and having an analyzer which is crossed relatively thereto, characterized by a first and a second $\lambda/2$ phase-retardation plate and a first optically addressable, spatially resolving light modulator designed as a $\lambda/2$-phase retardation plate, incident light propagating, in turn, through the polarizer, the first $\lambda/2$ phase-retardation plate, the first light modulator, and the second $\lambda/2$ phase-retardation plate, and, from there, impinging on the analyzer, a) the first $\lambda/2$ phase-retardation plate having a first indicatrix which
  without an external electric field, runs in a first rest-position direction;
  in response to the application of a first external electric field, runs in a first deflection direction, which is rotated with respect to the first rest-position direction by a first angle that is independent of the light intensity, about the direction of the first external electric field; and
  in response to the application of a second external electric field, equal and opposite to the first external electric field, runs in a second deflection direction, which is rotated with respect to the first rest-position direction by a second angle, equal and opposite to the first angle;
b) the first light modulator having a second indicatrix, which
  without an external electric field, runs in a second rest-position direction;
  in response to the application of a third external electric field, runs in a third deflection direction, which is rotated with respect to the second rest-position direction by a third angle, about the direction of the third external electric field;

in response to the application of a fourth external electric field, equal and opposite to the third external electric field, runs in a fourth deflection direction, which is rotated with respect to the second rest-position direction by a fourth angle, equal and opposite to the third angle;

the magnitude of the third and of the fourth angle increasing in response to increasing light intensity, up to a specific maximum value, not however beyond this, and the third and fourth deflection directions reaching a first and second limiting deflection direction, respectively, in the case that the magnitude of the third or fourth angle reaches the maximum value;

c) the second λ/2 phase-retardation plate having a third indicatrix which without an external electric field, runs in the first rest-position direction;

in response to the application of a fifth external electric field, runs in the first deflection direction; and in response to the application of an external sixth electric field, equal and opposite to the fifth external electric field, runs in the second deflection direction;

d) the first and the second phase-retardation plate and the first light modulator being so oriented to one another and with respect to the polarizer that the first deflection direction and the first limiting deflection direction run in parallel to one another and in parallel or perpendicularly to the input polarization direction, or the second deflection direction and the second limiting deflection direction run in parallel to one another and in parallel or perpendicularly to the input polarization direction, e) the first or second external electric field is applied to the first phase-retardation plate; the third or fourth external electric field is applied to the first light modulator; and the fifth or sixth external electric field is applied to the second phase-retardation plate; and f) the first and second, the third and fourth, and the fifth and sixth external electric fields, respectively, are selected in such a way that first angle α and maximum value βmax fulfill the condition 2α−max=n·45°+T, n being equal to 0, 1, 2, 3, . . . and T being a tolerance of ±5°.

Embodiments of the present invention are directed to a method for attenuating light as a function of intensity, the light passing through a polarizer (P1), which allows linearly polarized light to propagate through in one input polarization direction (EPR1, EPR2) and strike an analyzer (P2) that is crossed thereto by a substantial number of degrees (or by a substantial angle) or by 90 degrees, the light propagating, in turn, through polarizer (P1), a first λ/2 phase-retardation plate (1), a first optically addressable, spatially resolving light modulator (3) designed as a λ/2 phase-retardation plate, and a second λ/2 phase-retardation plate (3), and, from there, impinging on analyzer (P2), a) the first λ/2 phase-retardation plate (1) having a first indicatrix which without an external electric field, runs in a first rest-position direction (R1);

in response to the application of a first external electric field (+E1), runs in a first deflection direction (A), which is rotated with respect to the first rest-position direction (R1) by a first angle (+α) that is independent of the light intensity, about the direction of first external electric field (+E1); and in response to the application of a second external electric field (−E1), equal and opposite to first external electric field (+E1), runs in a second deflection direction (B), which is rotated with respect to first rest-position direction (R1) by a second angle (−α), equal and opposite to first angle (+α);

b) first light modulator (2) having a second indicatrix, which without an external electric field, runs in a second rest-position direction (R2);

in response to the application of a third external electric field (+E2), runs in a third deflection direction (C), which is rotated with respect to second rest-position direction (R2) by a third angle (+β), about the direction of the third external electric field (+E2);

in response to the application of a fourth external electric field (−E2), equal and opposite to third external electric field (+E2), runs in a fourth deflection direction (D), which is rotated with respect to second rest-position direction (R2) by a fourth angle (−β), equal and opposite to third angle (+β);

the magnitude of the third and of the fourth angle (+β, −β) increasing in response to increasing light intensity, up to a specific maximum value (βmax), not however beyond this, and third and fourth deflection directions (C, D) reaching a first and second limiting deflection direction (Cmax, Dmax), respectively, in the case that the magnitude of third or fourth angle (+β, −β) reaches maximum value (βmax);

c) the second λ/2 phase-retardation plate (3) having a third indicatrix which without an external electric field, runs in the first rest-position direction (R1);

in response to the application of a fifth external electric field (+E3), runs in first deflection direction (A); and in response to the application of an external sixth electric field (−E3), equal and opposite to fifth external electric field (+E3), runs in second deflection direction (B);

d) first and the second phase-retardation plates (1, 3) and first light modulator (2) being so oriented to one another and with respect to polarizer (P1) that first deflection direction (A) and first limiting deflection direction (Cmax) running in parallel to one another and in parallel or perpendicularly to input polarization direction (EPR1, EPR2), or second deflection direction (B) and second limiting deflection direction (Dmax) running in parallel to one another and in parallel or perpendicularly to input polarization direction (EPR1, EPR2);

e) first or second external electric field (+E1, −E1) being applied to first phase-retardation plate (1), third or fourth external electric field (+E2−E2) being applied to first light modulator (2), and fifth or sixth external electric field (+E3, −E3) being applied to second phase-retardation plate (3); and f) first and second, third and fourth, and fifth and sixth external electric fields (+E1, −E1, +E2, −E2, +E3, —E3), respectively, being selected in such a way that first angle (α) and maximum value (βmax) fulfill the condition 2α−βmax=n·45°+T, n being equal to 0, 1, 2, 3, . . . and T being a tolerance of ±5°.

Embodiments of the present invention may permit a direct straight-line transmitted-light operation, i.e., the light may enter into the system on one side and emerge again on the opposite side in parallel to the direction of incidence.

As when using binoculars, the sightline of the eye conforms in this case to the sightline of the system (the optical assemblage), making it easier to manually sight objects.

In one specific embodiment, the first and the second λ/2 phase-retardation plates and the first light modulator are positioned in parallel with one another.

The first and second external electric fields, respectively, are preferably generated by a first plate capacitor, between whose plates the first phase-retardation plate is situated. The third and fourth external electric fields, respectively, are preferably generated by a second plate capacitor, between whose plates the first light modulator plate is situated. The fifth and sixth external electric fields, respectively, are preferably generated by a third plate capacitor, between whose plates the second phase-retardation plate is situated.

Embodiments of the present invention are directed to an intensity-dependent attenuation device for light, having a polarizer, which allows linearly polarized light to propagate through in one input polarization direction, and having an analyzer which is crossed relatively thereto, characterized by a first λ/2 phase-retardation plate, a second optically addressable, spatially resolving light modulator designed as a λ/4 phase-retardation plate, and a mirror, incident light propagating, in turn, through the polarizer, the first λ/2 phase-retardation plate, and the second light modulator, and, from there, impinging on the mirror, and, subsequently, in the reverse direction, again propagating through the second light modulator and the first λ/2 phase-retardation plate and, from there, impinging on the analyzer, a) the first λ/2 phase-retardation plate having a first indicatrix which without an external electric field, runs in a first rest-position direction;

in response to the application of a first external electric field, runs in a first deflection direction, which is rotated with respect to the first rest-position direction by a first angle that is independent of the light intensity, about the direction of the first external electric field; and in response to the application of a second external electric field, equal and opposite to the first external electric field, runs in a second deflection direction, which is rotated with respect to the first rest-position direction by a second angle, equal and opposite to the first angle;

b) the second light modulator having a fourth indicatrix, which without an external electric field, runs in a second rest-position direction;

in response to the application of a seventh external electric field, runs in a third deflection direction, which is rotated with respect to the second rest-position direction by a third angle, about the direction of the seventh external electric field;

in response to the application of an eighth external electric field, equal and opposite to the seventh external electric field, runs in a fourth deflection direction, which is rotated with respect to the second rest-position direction by a fourth angle, equal and opposite to the third angle;

the magnitude of the third and of the fourth angle increasing in response to increasing light intensity, up to a specific maximum value, not however beyond this, and the third and fourth deflection directions reaching a first and second limiting deflection direction, respectively, in the case that the magnitude of the third or fourth angle reaches the maximum value;

c) the first and the second phase-retardation plate and the first light modulator being so oriented to one another and with respect to the polarizer that the first and the third deflection direction run in parallel to one another and in parallel or perpendicularly to the input polarization direction, or the second and the fourth deflection directions run in parallel to one another and in parallel or perpendicularly to the input polarization direction;

d) the first or second external electric field is applied to the first phase-retardation plate, and the seventh or eighth external electric field is applied to the second light modulator; and e) the first and second, and the seventh and eighth external electric fields, respectively, are selected in such a way that first angle α and maximum value βmax fulfill the condition 2α−βmax=n·45°+T, n being equal to 0, 1, 2, 3, . . . and T being a tolerance of ±5°.

Embodiments of the present invention are directed to a method for attenuating light as a function of intensity, the light passing through a polarizer (P1), which allows linearly polarized light to propagate through in one input polarization direction (EPR1, EPR2) and strike an analyzer (P2, ST1, ST2, ST3) that is crossed thereto by a substantial number of degrees (by a substantial angle) or by 90 degrees, characterized by a first λ/2 phase-retardation plate (1), a second optically addressable, spatially resolving light modulator (4) designed as a λ/4 phase-retardation plate, and a mirror (5), incident light (10a, 10b) propagating, in turn, through polarizer (P1, ST1, ST2, ST3), first λ/2 phase-retardation plate (1), and second light modulator (4), and, from there, impinging on mirror (5), and, subsequently, in the reverse direction, again propagating through second light modulator (4) and first λ/2 phase-retardation plate (1) and, from there, impinging on analyzer (P2, ST1, ST2, ST3), a) the first λ/2 phase-retardation plate (1) having a first indicatrix which without an external electric field, runs in a first rest-position direction (R1);

in response to the application of a first external electric field (+E1), runs in a first deflection direction (A), which is rotated with respect to the first rest-position direction (R1) by a first angle (+β) that is independent of the light intensity, around the direction of first external electric field (+E1); and in response to the application of a second external electric field (−E1), equal and opposite to first external electric field (+E1), runs in a second deflection direction (B), which is rotated with respect to first rest-position direction (R1) by a second angle (−α), equal and opposite to first angle (+α);

b) second light modulator (4) having a fourth indicatrix which without an external electric field, runs in a second rest-position direction (R2);

in response to the application of a seventh external electric field (+E4), runs in a third deflection direction (C), which is rotated with respect to second rest-position direction (R2) by a third angle (+β), around the direction of seventh external electric field (+E4);

in response to the application of an eighth external electric field (−E4), equal and opposite to seventh external electric field (+E4), runs in a fourth deflection direction (D), which is rotated with respect to second rest-position direction (R2) by a fourth angle (−β), equal and opposite to third angle the magnitude of the third and of the fourth angle (+β, −β) increasing in response to increasing light intensity, up to a specific maximum value (βmax), not however beyond this, and third and fourth deflection directions (C, D) reaching a first and second limiting deflection direction (Cmax, Dmax), respectively, in the case that the magnitude of third or fourth angle (+β, −β) reaches maximum value (βmax);

c) first and second phase-retardation plates (1, 2) and first light modulator (3) being so oriented to one another and with respect to polarizer (P11, ST1, ST2, ST3) that first deflection direction (A) and first limiting deflection direction (Cmax) run in parallel to one another and in parallel or perpendicularly to input polarization direction (EPR1, EPR2), or second deflection direction (B) and second limiting deflection direction (Dmax) running in parallel to one another and in parallel or perpendicularly to input polarization direction (EPR1, EPR2);

d) first or second external electric field (+E1, −E1) being applied to first phase-retardation plate (1), and seventh or eighth external electric field (+E4, −E4) being applied to second light modulator (4); and e) first and second, seventh and eighth external electric fields (+E1, −E1, +E4, −−E4), respectively, being selected in such a way that first angle (α) and maximum value (βmax) fulfill the condition 2α−βmax=n·45°+T, n being equal to 0, 1, 2, 3, . . . and T being a tolerance of ±5°.

Due to the reflection of the light at the mirror, the second optically addressable, spatially resolving light modulator, designed as a λ/4 phase-retardation plate, is passed through twice and, due to the phase jump associated with the reflection, acts on the polarization direction of the light as an optically addressable, spatially resolving light modulator that is designed as a λ/2 phase-retardation plate. A second λ/2 phase-retardation plate is not necessary in this system (optical assemblage), since the first λ/2 phase-retardation plate is likewise passed through twice.

This system and, respectively, this method do not permit any straight-line transmitted-light operation. However, an indirect, straight-line, transmitted-light operation may be enabled by using suitable light-deflection devices, e.g., additional mirrors.

In a further embodiment, this specific embodiment includes a polarizing beam splitter, which combines the polarizer and analyzer, thus incorporating both. In this connection, the polarizing beam splitter acts as a polarizer for incident light and, at the same time, as an analyzer for light reflected at the mirror.

In addition, the use of a polarizing beam splitter makes it possible to not only subject one polarization direction to an intensity-dependent attenuation in accordance with the present invention and to block the polarization direction that is perpendicular thereto using the polarizer, but also to subject both polarization directions at the same time to an intensity-dependent attenuation in accordance with the present invention, so that no polarization direction needs to be blocked. Thus, this specific embodiment of the present invention works independently of the polarization of the light to be attenuated.

In this specific embodiment of the present invention, the incident light propagating through the polarizing beam splitter is divided into a linearly polarized first beam component, which is deflected in the polarizing beam splitter, and into a second beam component, which is linearly polarized perpendicularly to the first beam component and is not deflected in the polarizing beam splitter. At this point, both beam components are subjected, separately from one another, to an intensity-dependent attenuation in accordance with the present invention. In the process, both the first, as well as the second beam components pass, separately from one another, through first λ/2 phase-retardation plate and the second light modulator, and impinge on the mirror. From there, in reverse order, they pass again through the second light modulator and the first λ/2 phase-retardation plate, and arrive again in the polarizing beam splitter.

There, the first beam component is divided into a third beam component which is linearly polarized in parallel to the first beam component and is deflected in the polarizing beam splitter, and into a fourth beam component which is linearly polarized perpendicularly to the first beam component and is not deflected in the polarizing beam splitter.

After once again entering into the polarizing beam splitter, the second beam component is divided into a fifth beam component, which is linearly polarized at right angles to the second beam component and is deflected in the polarizing beam splitter, and into a sixth beam component which is linearly polarized in parallel to the second beam component and is not deflected in the polarizing beam splitter. Thus, the sixth beam component is directed in an opposite, parallel direction to the incident light. The fourth and the fifth beam components are polarized perpendicularly to one another.

The fourth and/or the fifth beam components are supplied to a monitoring or analysis, since they are deflected oppositely to the incident light. The sum of the intensities of the fourth and fifth beam components is dependent, in accordance with the present invention, not on the polarization state, but rather only on the intensity of the incident light. Thus, the information contained in the polarization state of the incident light is not lost, but rather is contained in the sum of the fourth and fifth beam components.

In one specific embodiment, the first λ/2 phase-retardation plate, the second light modulator, and the mirror are positioned in parallel to one another, so that normally (or perpendicularly) incident light is reflected into itself.

One or more light-deflecting surfaces may be configured between the polarizing beam splitter and the first λ/2 phase-retardation plate to deflect the first and the second beam components, respectively, in a way that enables them to run in parallel to one another.

In addition, the polarizing beam splitter itself may have at least one light-deflecting surface which deflects the first and the second beam component, respectively, in a way that enables them to run in parallel to one another.

In a refinement of this specific embodiment, the polarizing beam splitter is formed and positioned in such a way that the path of the fourth beam component coincides with the path of the fifth beam component, so that, together, they are able to be supplied to a monitoring or evaluation.

To suppress stray light, a collimator may be placed upstream from the mirror.

One specific embodiment of the present invention provides for a lens, which images a field-of-view onto the light modulator. In a further refinement of this specific embodiment, an eyepiece is positioned in a way that enables the image of the field-of-view to be observed using the eyepiece. Thus, such a specific embodiment of the present invention is a type of telescope which attenuates the intensity of bright points of the field-of-view percentually more than that of less bright points.

In accordance with the present invention, those λ/2 phase-retardation plates are used which have an indicatrix whose direction may be influenced by applying an electric field, this direction not depending on the light intensity and being the same over the entire surface of the λ/2 phase-retardation plate. The rotation of the indicatrix is based on a reorientation of molecules or of molecular parts, stimulated by the electric field, the macroscopic orientation of the λ/2 phase-retardation plate itself remaining unaffected. λ/2 phase-retardation plates of this kind have been available.

Embodiments of the present invention provide for a light modulator to be used which, in contrast to the λ/2 phase-retardation plates, has an indicatrix whose direction may be influenced both by applying an electric field, as well as by the light intensity. Such light modulators are referred to as "optically addressable, spatially resolving light modulators" or "OASLMs." Embodiments of the present invention provide for using such a light modulator as a non-linear optical filter.

In this connection, a light modulator having a birefringent liquid-crystal layer is preferably used, which, for example, may be a liquid-crystal film of chiral smectic-C material, whose molecules have a ferroelectric, deformable helix.

In a constant electric field, electrolysis causes liquid crystals to decompose. To prevent this, one specific embodiment provides for applying an AC (alternating current) voltage having a substantially square-wave time characteristic to the third or fourth plate capacitor, so that the third and the fourth, and the seventh and the eighth electric field, respectively, continually replace one another.

Thus, the polarity of the electric field in the third or fourth capacitor, i.e., the electric field applied to the first or second light modulator, is continually reversed. In response to each polarity reversal, the second and fourth indicatrices, respectively, rotate back and forth between third angle +β and fourth angle −β, these angles being in relation to the particular rest-position direction of the second and fourth indicatrices, respectively, and, at a high light intensity, the magnitude of angles +β and −β being able to attain, at the most, maximum value βmax.

In this case, the angular condition 2α−βmax=n·45°+T is only fulfilled for one polarity of the electric field in the second and fourth plate capacitor, respectively. For that reason, in the case that the polarity of the electric field applied to the first or second light modulator is reversed, the polarity of the electric field applied to the λ/2 phase-retardation plate(s) is also reversed in phase therewith, so that the first and third indicatrices and the first indicatrix, respectively, rotate back and forth between first angle +α and second angle −α, each time in relation to the rest-position direction of the first and third indicatrices, respectively, thereby fulfilling the angular condition for both polarities. This takes place in that an AC voltage having a substantially square-wave characteristic is also applied to the first and third plate capacitor, respectively.

Therefore, in this specific embodiment of the present invention, the zero crossings of all AC voltages occur simultaneously. In one specific embodiment, all AC voltages originate from a common voltage source, where the individual field strengths may be adjustable by using suitable voltage-adjusting devices, such as potentiometers.

The first and second external electric fields, respectively, are preferably generated by a first plate capacitor, between whose plates the first phase-retardation plate is situated. The seventh and eighth external electric fields, respectively, are preferably generated by a fourth plate capacitor, between whose plates the second light modulator is situated.

The plates of the plate capacitors may be constituted of electrically conductive layers which are at least partially reflecting (or partially transparent) to light, such as of indium tin oxide, and be directly placed on the light-transit surfaces of the phase-retardation plates or of the light modulators, or be placed at a distance, in parallel to the same, using a transparent substrate material. In another specific embodiment, the layers are made of a thin layer of metal.

BRIEF DESCRIPTION OF THE DRAWINGS

FIG. 2b shows the device of FIG. 2a, the polarity of the electric fields being the reverse of that in FIG. 2a.

DETAILED DESCRIPTION

Figure 1:
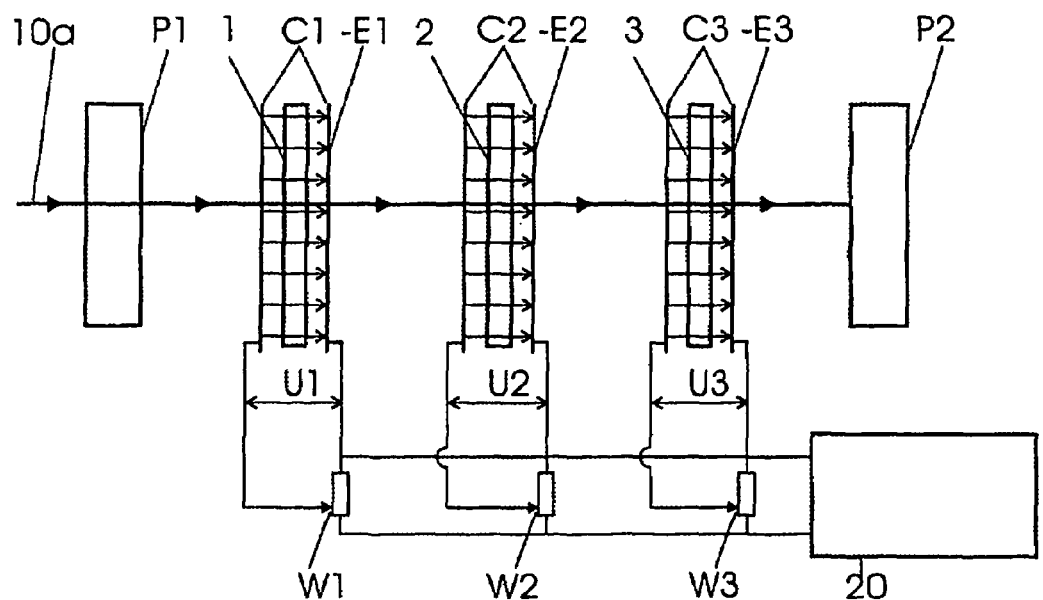
FIG. 1 shows a schematic cross-sectional representation of a specific embodiment of a device according to the present invention for transmitted-light operation, inclusive of the electrical wiring, as well as of the electric fields generated by the same, a high-intensity beam of light being incident.

FIG. 1 shows a cross-sectional representation of a specific embodiment a device according to the present invention for transmitted-light operation, inclusive of the electrical wiring and of the electric fields generated by the same. A light beam 10a of high intensity is incident on polarizer P1.

The light component transmitted or admitted by this polarizer passes through a first λ/2 phase-retardation plate 1, a first optically addressable, spatially resolving light modulator 2 designed as a λ/2 phase-retardation plate, and a second λ/2 phase-retardation plate 3, and impinges on an analyzer P2 that is crossed with respect to polarizer P1.

First λ/2 phase retardation plate 1, light modulator 2, and second λ/2 phase-retardation plate 3 are arranged between the plates of a plate capacitor C1, C2, C3, respectively. The plates of plate capacitors C1, C2, C3 are constituted of light-transmitting (or transparent), electrically conductive layers which are made of a thin layer of vapor-deposited metal or of indium tin oxide.

Using a voltage source 20 and potentiometers W1, W2, W3, a voltage U1 is applied to first plate capacitor C1, a voltage U2 to second plate capacitor C2, and a voltage U3 to third plate capacitor C3, so that an electric field is produced in each of plate capacitors C1, C2, C3.

First $\lambda/2$ phase-retardation plate 1, light modulator 2, and second $\lambda/2$ phase-retardation plate 3 preferably contain liquid crystals, which decompose in an electric field of constant polarity, as the result of electrolysis. To prevent this, voltage source 20 supplies an AC voltage Uo preferably having a substantially square-wave time characteristic, so that the polarity of voltages U1, U2, U3 and thus also the electric fields are continually reversed in plate capacitors C1, C2, C3. The square-wave time characteristic of the AC voltage is preferably selected in such a way that the transition times are kept as short as possible when switching over between positive and negative polarity or vice versa. The advantage of short transition times is elucidated below.

First potentiometer W1 is adjusted in such a way that first $\lambda/2$ phase-retardation plate 1 in plate capacitor C1 is alternately situated in a first external electric field +E1 and a second external electric field –E1 equal and opposite hereto. Analogously to this, second and third potentiometers W2, W3 are adjusted in such a way that light modulator 2 in plate capacitor C2 and second $\lambda/2$ phase-retardation plate 3 in plate capacitor C3, respectively, are alternately situated in a third and in a fourth external electric field +E2, –E2 equal and opposite hereto, and, respectively, in a fifth and a sixth external electric field +E3, –E3 equal and opposite hereto. Electric fields +E1, +E2, +E3 are cyclically reversed in polarity by AC voltages U1, U2, U3 into electric fields –E1, –E2, –E3 which are equal and opposite thereto, respectively. These polarity reversals take place simultaneously, since all three voltages U1, U2, U3 originate from shared voltage source 20 and run analogously to AC voltage Uo.

The situation is illustrated in FIG. 1 at an instant when first $\lambda/2$ phase-retardation plate 1 is situated in field –E1, light modulator 2 in field –E2, and second $\lambda/2$ phase-retardation plate 3 in field –E3. Electric fields –E1, –E2, –E3 are shown in FIG. 1 by a plurality of arrows running to the right.

Figure 2A:
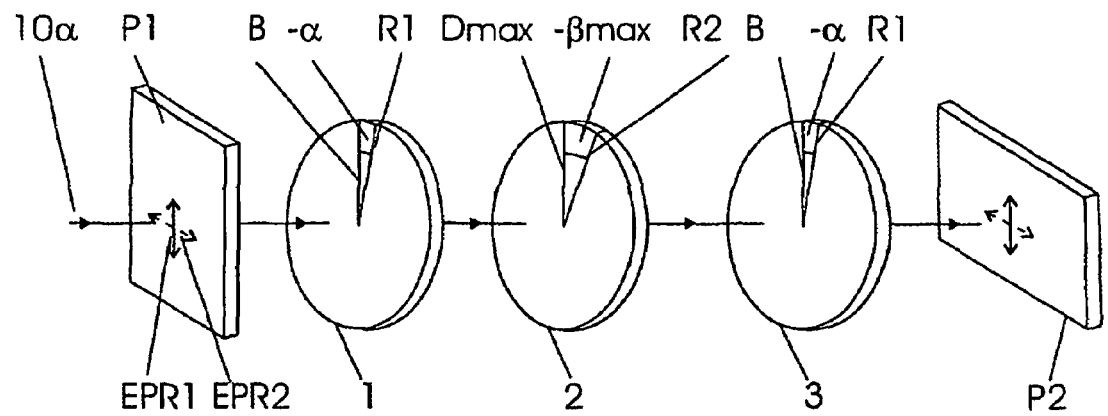
FIG. 2a shows a schematic perspective representation of the device of FIG. 1, at the same point in time as in FIG. 1, the electrical wiring being omitted.
Figure 2B:
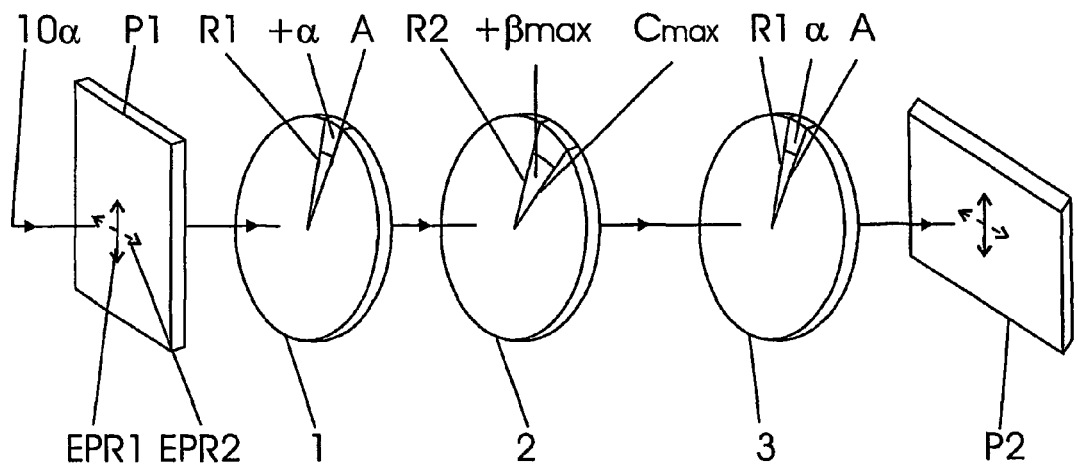

FIGS. 2a and 2b show schematic, perspective representations of the device of FIG. 1, the plate capacitors and their electric wiring being omitted for the sake of clarity. Clockwise rotations are characterized in the following by angles having a positive sign, and counter-clockwise rotations by angles having a negative sign.

Light beam 10a of high intensity is incident on polarizer P1. This is oriented in such a way that it only allows one light component having a first input polarization direction EPR1 to pass; reference is made further below to second polarization direction EPR2 that is perpendicular thereto. After the light component having polarization direction EPR1 has left polarizer P1, it impinges on first $\lambda/2$ phase-retardation plate 1.

First $\lambda/2$ phase-retardation plate 1 has a first indicatrix which runs without an external electric field in a first rest-position direction R1. When, however, first or second external electric field +E1 and –E1, respectively, (FIG. 1) is applied to first $\lambda/2$ phase retardation plate 1, its molecules or parts thereof reorient themselves in such a way that the first indicatrix rotates out of first rest-position direction R1 into a first or second deflection direction A and B, respectively, which is rotated with respect to first is rest-position direction R1 by a first and, respectively, second angle +α, –α that is equal and opposite thereto, about the direction of electric field +E1 and –E1, respectively. Angles +α, –α are independent of the light intensity.

Once the light has propagated through first $\lambda/2$ phase-retardation plate 1, it impinges on first light modulator 2. This has a second indicatrix which runs without an external electric field in a second rest-position direction R2. When, however, third or fourth external electric field +E2, —E2 (FIG. 1) is applied to first light modulator 2, the second indicatrix rotates out of second rest-position direction R2 into a third or fourth deflection direction C and D, respectively, which is rotated with respect to second rest-position direction R2 by a third and, respectively, fourth angle +β, –β that is equal and opposite thereto, about the direction of electric field +E2 and –E2, respectively. The magnitude of third and fourth angle +β and β, respectively, increases in response to increasing light intensity, up to a specific maximum value βmax, not, however, beyond this, so that third and fourth deflection directions C and D reach first and second limiting deflection directions Cmax and Dmax, respectively, in the case that the magnitude of third or fourth angle +β and –β, respectively, reaches maximum value βmax.

In the following, to facilitate understanding, it is assumed that light beam 10a is so intense that the magnitude of third and fourth angle +β, respectively, assumes maximum value βmax, so that third and fourth deflection directions C and D conform with first and second limiting direction Cmax and Dmax, respectively. The second indicatrix runs in this case in the first or second limiting deflection direction Cmax and Dmax, respectively.

The light subsequently impinges on second $\lambda/2$ phase-retardation plate 2. This plate has a third indicatrix, which runs without external electric field in first rest-position direction R1 and in fifth and sixth external electric field +E3 and –E3, respectively, (FIG. 1) is rotated out of first rest position direction R1 by first and second angle +α and –α, respectively, that are independent of the light intensity, into first and second deflection direction A and B, respectively. Thus, the third indicatrix always runs in parallel to the first indicatrix. Therefore, in one specific embodiment of the present invention, first and second $\lambda/2$ phase-retardation plates 1, 2 are identical in design, and electric fields –E1 and –E3 or +E1 and +E3, respectively, applied thereto, are each of the same absolute value. After passing through second $\lambda/2$ phase-retardation plate 2, the light impinges on analyzer P2, which is situated, in accordance with the present invention, so as to be crossed with respect to polarizer 1. This position of analyzer P2 is characterized in FIGS. 2a, 2b by a solid-line, horizontal double arrow.

The mutual orientation of input polarization direction EPR1, of first rest-position direction R1, and of second rest-position direction R2 is expressed in accordance with the present invention by the following conditions, (a) first angle α and maximum value βmax fulfill the condition 2α–βmax=n·45°+T, n being equal to 0, 1, 2, 3, . . . and T being a tolerance of ±5°.

(b) either first deflection direction A and first limiting deflection direction Cmax run both in parallel or perpendicularly to input polarization direction EPR1, or second deflection direction B and second limiting deflection direction Dmax either both run in parallel or perpendicularly to input polarization direction EPR1.

The condition mentioned under (a) is able to be fulfilled by properly selecting external electric fields +E1 and –E1, +E2 and –E2, or +E3 and –E3, respectively. The condition named under (b) is fulfilled in that first and second λ/2 phase-retardation plates 1, 3, as well as light modulator 2 are installed in an appropriate orientation in the device of FIG. 2a.

FIG. 2A shows the device of FIG. 1 at the same point in time as in FIG. 1, i.e., electric fields −E1, −E2, −E3 are applied.

With regard to condition (a), the specific embodiment of the present invention illustrated in FIG. 2a corresponds to the case n=0, T=0, the electric fields being selected in accordance with the present invention by setting potentiometers W1, W2, W3 (FIG. 1) in such a way that the condition named under (a) is fulfilled. With regard to condition (b), the specific embodiment of the present invention illustrated in FIG. 2a corresponds to the case where second deflection direction B and second limiting deflection direction Dmax both run in parallel to input polarization direction EPR1. From this is derived for n=0, T=0, that second rest-position direction R2, as compared to EPR1 direction, forms twice as great an angle as first rest-position direction R1.

Generally, the polarization direction of linearly polarized light is inverted with respect to the direction of the indicatrix of the λ/2 plate when passing through the same. This effect is utilized by the present invention, as explained in the following.

After the light component having polarization direction EPR1 has left polarizer P1, it impinges on first λ/2 phase-retardation plate 1. This plate has a first indicatrix, which is rotated out of first rest position direction R1 by a second angle −α into a second deflection direction B, since second electric field −E1 is being applied. This angle is independent of the light intensity. In addition, in accordance with condition (a), first phase-retardation plate 1 is oriented with respect to polarizer P1 in such a way that second deflection direction B runs in parallel to input polarization direction EPR1.

For that reason, the light component having polarization direction EPR1 and coming from polarizer P1 meets with a first indicatrix, which is in parallel to polarization direction EPR1, in first λ/2 phase-retardation plate 1. Therefore, an inversion of the polarization direction with respect to the first indicatrix results in polarization direction EPR1 passing into itself. Therefore, when passing through first λ/2 phase-retardation plate 1, there is no change in the polarization direction.

The light subsequently impinges on first light modulator 2. This modulator has a second indicatrix, which is rotated out of second rest position direction R2 by a fourth angle −β, since field −E2 is being applied. Due to the high intensity of light beam 10a, at the point of incidence of the light beam on light modulator 2, fourth angle −β reaches maximum magnitude βmax, so that fourth angle −β in FIG. 2a has value −βmax. Thus, the second indicatrix runs in second limiting deflection direction Dmax.

In accordance with condition (a), first light modulator 2 is oriented with respect to polarizer P1 in such a way that second deflection direction Dmax runs in parallel both to second deflection direction B, as well as to input polarization direction EPR1. Therefore, at its point of incidence on first light modulator 2, the light, which is polarized in the EPR1 direction, meets with the second indicatrix in parallel to polarization direction EPR1. Thus, when traversing first light modulator 2, polarization direction EPR1 passes again into itself, so that there is again no change in the polarization direction.

The light, which continues to be polarized in the EPR1 direction, subsequently impinges on second λ/2 phase-retardation plate 2. This plate has a third indicatrix, which is rotated out of first rest-position direction R1 by second angle −α that is independent of the light intensity, into second deflection direction B, since field −E3 is being applied. In accordance with condition (a), second deflection direction B runs in parallel to input polarization direction EPR1. Thus, when traversing second λ/2 phase-retardation plate 3, polarization direction EPR1 passes again into itself, so that there is again no change in the polarization direction.

For that reason, the light impinges in input polarization direction EPR1 on analyzer P2, which is situated in accordance with the present invention so as to be crossed with respect to polarizer P1, so that the light from analyzer P2 is completely filtered out.

FIG. 2b shows the device from FIG. 2a, a high-intensity light beam 10a again being incident thereon, however the polarity of the electric fields being the reverse of that in FIG. 2a. Accordingly, the situation is illustrated in FIG. 2b at an instant when first λ/2 phase-retardation plate 1 is situated in field +E1, light modulator 2 in field +E2, and second λ/2 phase-retardation plate 3 in field +E3.

In addition it holds that condition (a) is realized for the case that n=0, T=0 and, in accordance with condition (b), second deflection direction B and second limiting deflection direction Dmax both run in parallel to input polarization direction EPR1.

At the instant shown in FIG. 2b, first λ/2 phase-retardation plate 1 has a first indicatrix, which is rotated out of first rest-position direction R1 into first deflection direction A, which is rotated by a first angle +α with respect to first rest-position direction R1, since field +E1 is being applied. Thus, first deflection direction A is rotated by twice the magnitude of first angle +α, thus by 2α, as compared to second deflection direction B and thus also with respect to input polarization direction EPR1. This angle is independent of the light intensity.

For that reason, the light component having polarization direction EPR1 and leaving polarizer P1 meets with a first indicatrix, which forms an angle 2α with polarization direction EPR1, in first λ/2 phase-retardation plate 1. Therefore, the inversion of the polarization direction with respect to the first indicatrix that occurs when first λ/2 phase-retardation plate 1 is traversed, results in a rotation of polarization direction EPR1 by an angle 4α.

For that reason, after the light has passed through first λ/2 phase-retardation plate 1, it impinges on first light modulator 2 in a polarization direction that is rotated by angle 4α with respect to input polarization direction EPR1. This modulator has a second indicatrix which, due to the high intensity of light beam 10a, runs in electric field +E2 at the point of incidence of light on light modulator 2 in first limiting deflection direction Cmax, which is rotated with respect to second rest-position direction R2 by maximum value βmax. On the basis of condition (a), it follows for n=0 and T=0 that βmax=2α and, thus, 2βmax=4α.

First limiting deflection direction Cmax, for its part, is likewise rotated by angle βmax with respect to second rest-position direction R2 and, therefore, at the point of incidence of light on light modulator 2, by angle 2βmax with respect to input polarization direction EPR1. In accordance with the present invention, the polarization direction of the light incident on first light modulator 2 is identical to the direction of the second indicatrix, in FIG. 2b as well. Thus, when traversing first light modulator 2, i.e., in response to inversion of the polarization direction with respect to the direction of the second indicatrix, this polarization direction does not change, rather passes into itself. Therefore, the light leaves the first light modulator in a polarization direction, which continues to be rotated with respect to input polarization direction EPR1 by angle 4α.

This light subsequently impinges on second λ/2 phase-retardation plate 2, which has a third indicatrix, which is rotated in fifth external electric field +E3 out of first rest-position direction R1 by angle +α, which is independent of the light intensity, into first deflection direction A, which means that the third indicatrix in field +E3 forms an angle 2α with input polarization direction EPR1 (polarization direction 0°).

This angle is smaller by 2α and, thus, half the size of angle 4α formed by the polarization direction of the light when impinging on second λ/2 phase-retardation plate 2, with input polarization direction EPR1. Therefore, the inversion of the polarization direction with respect to the third indicatrix results in a rotation of the polarization direction by an angle of −4α, i.e., a rotation is carried out back to input polarization direction EPR1.

For that reason, the light impinges in input polarization direction EPR1 on analyzer P2, which is situated in accordance with the present invention so as to be crossed with respect to polarizer P1, so that the light from analyzer P2 is completely filtered out.

Accordingly, in accordance with the present invention, when conditions (a) and (b) are met, the system (or optical assemblage) of FIGS. 2a and 2b, respectively, always blocks a light beam 10a of high enough intensity independently of the momentary polarity of AC voltage Uo.

Figure 3:
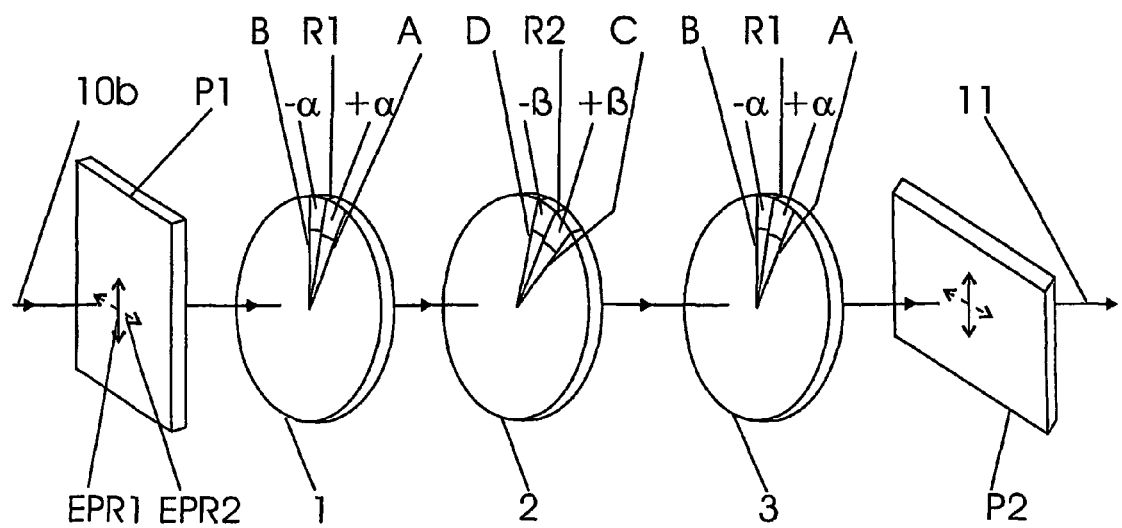
FIG. 3 shows the device of FIGS. 2a and 2b, respectively, a low-intensity beam of light being incident.

At this point, reference is made to FIG. 3, which shows the device of FIGS. 2a and 2b, respectively, a low-intensity beam of light beam 10b being incident thereon. For the sake of clarity, the situations are shown at the same time in FIG. 3, where electric fields +E1, +E2, +E3 are applied, and where fields −E1, −E2, −E3 having reversed polarity are applied to first phase-retardation plate 1, to light modulator 2, and to second phase-retardation plate 2, although these situations do not occur simultaneously, but rather alternating with the frequency of AC voltage Uo (FIG. 1).

Initially, analogously to FIG. 2a, the case is considered where electric fields −E1, −E2 and −E3, respectively, are applied to first phase-retardation plate 1, to first light modulator 2, and to second phase-retardation plate 3, respectively. Light beam 10b of low intensity traverses polarizer P2, which only allows that component of the light beam which has input polarization direction EPR1 to pass through. This light impinges on the first phase-retardation plate, which has a first indicatrix, which, in the same way as in the situation of FIG. 2a, runs in second deflection direction B rotated by second angle −α counter to first rest position direction R1, since field −E1 is being applied, and second angle −α is independent of the light intensity. Therefore, when passing through first phase-retardation plate 1, there is no change in the polarization direction.

On the other hand, the indicatrix of first light modulator 2, i.e., the second indicatrix, is deflected at the point of incidence of the light only by a small angle −β out of second rest-position direction R2 and runs in a fourth deflection direction D, which, in contrast to the situation of FIG. 2a, is not in parallel to the EPR1 direction, but rather only differs slightly from second rest-position direction R2, since field −E2 is being applied, but the magnitude of angle β is intensity-dependent and light beam 10b is of low intensity. Therefore, when the weak light beam propagates through first light modulator 3, the polarization direction rotates by twice the angular difference βmax−β. For very strong light intensity, the magnitude of β approaches βmax, so that, in this case, the angular difference βmax−β approaches zero, and there is no rotation of the polarization direction which corresponds to the situation of FIG. 2a. On the other hand, for very weak light intensity, the magnitude of approaches zero, so that, in this case, the polarization direction is rotated by angle 2βmax.

The third indicatrix of second phase-retardation plate 3 runs in parallel to first indicatrix, thus in EPR1 direction, since field −E3 is applied. Therefore, the light beam strikes second phase-retardation plate 3 in a polarization direction that is rotated by angle 2·(βmax−β) counter to EPR1 direction. As the result of inversion with respect to the third indicatrix, this passes over into a polarization direction which is rotated by angle −2·(βmax−β) counter to the EPR1 direction, which corresponds to a rotation about angle −4·(βmax−β).

For very weak light intensity, angle −2·(βmax−β) approaches value −2βmax. For the particularly favorable special case βmax=45°, a very weak light beam exits the second phase-retardation plate, rotated by −90° counter to the EPR1 direction, and is, therefore, able to pass through analyzer P2 without being attenuated.

Analogously to the situation depicted in FIG. 2b, in FIG. 3, the case is considered where electric fields +E1 and +E2 and +E3, respectively, are applied to first phase-retardation plate 1, to first light modulator 2, and to second phase-retardation plate 3, respectively. Light having input polarization direction EPR1 impinges on first phase-retardation plate, whose indicatrix runs in first deflection direction A that is rotated by first angle +α counter to first rest-position direction R1 and, thus, by angle +2α counter to the EPR1 direction. Therefore, when first phase-retardation plate 1 is passed through—inversion of input polarization direction EPR1 with respect to first deflection direction A—the polarization direction is rotated by angle 4α, so that, after passing through first phase-retardation plate, the polarization direction is rotated by angle 4α counter to the EPR1 direction.

The indicatrix of first light modulator 2, i.e., the second indicatrix, is deflected at the point of incidence of the light, only by a small angle +β, out of second rest-position direction R2, since field +E2 is applied, but light beam 10b is of low intensity. Therefore, at the point of incidence of the light, the second indicatrix runs in a third deflection direction C which differs by angle +β from second rest-position direction R2 and, thus, due to condition (b), by angle βmax+β from the EPR1 direction. In addition, in accordance with condition (a) for n=0 and T=0, angle βmax=2α, so that βmax+β=2α+β.

Therefore, the angular difference between the polarization direction of the light beam striking first light modulator 2, and third deflection direction C amounts to 2α+β−4α=−2α+β. For that reason, when traversing light modulator 2, i.e., when inverted with respect to third deflection direction C, the polarization direction is rotated by angle −4α+2β.

When impinging on second phase-retardation plate 3, the polarization direction of the light beam is rotated by angle +2β counter to the EPR1 direction. The third indicatrix runs in first deflection direction A, since external electric field +E3 is applied to second phase-retardation plate 3. Therefore, the angular difference from the polarization direction of the light beam impinging on second phase-retardation plate 3 amounts to +2α−2β. Thus, a rotation of the polarization direction follows—inversion with respect to the third indicatrix—by angle +4α−4β, so that the light beam leaves the second phase-retardation plate in a polarization direction that is rotated by angle +4α−4β counter to the EPR1 direction.

For very small light intensities, angle β approaches zero. In addition, due to condition (a), for n=0, T=0, thus for the specific embodiment of the present invention elucidated here, it holds that βmax=2α. For the particularly favorable special case βmax=45°α, a very weak light beam exits the second phase-retardation plate, rotated by 90° counter to the EPR1 direction, and is therefore able to pass through analyzer P2 without being attenuated.

However, when such a large maximum value of βmax=45° is not able to be attained using the particular liquid crystals, the present invention may also be applied; in this case, merely the maximum possible transmission is reduced, so that weak light beams may also be noticeably attenuated. However, since intense light beams are completely filtered out, the applicability of the present invention is also retained in this case. Thus, one also derives the substantial benefit from the present invention of also being able to use those liquid crystals in the light modulator with which only a maximum value βmax of considerably less than 45° is attainable. For βmax=30°, for example, a maximum transmission of 50% is still reached.

In accordance with the present invention, when conditions (a) and (b) are met, the system (or optical assemblage) of FIG. 3 always allows a very weak light beam 10b to pass through, independently of the momentary polarity of AC voltage Uo.

Even when angle β is greater than zero, the light beam may pass through the analyzer, the transmission decreasing, however, in response to an increasing angle b, i.e., in response to an increase in the light intensity, and, for example, at β=45° reaching the value zero and thus passing over into the situation of FIGS. 2a and 2b, respectively, i.e., complete blocking.

When the polarity of the fields is reversed, the indicatrices pass from one deflection direction into another. In the transition time, condition (a) or (b) or both conditions is/are not met, so that the light-attenuating effect of the present invention cannot be achieved. For that reason, it is advantageous to have short transition times or a short response time of the indicatrix to change of light.

Figure 4:
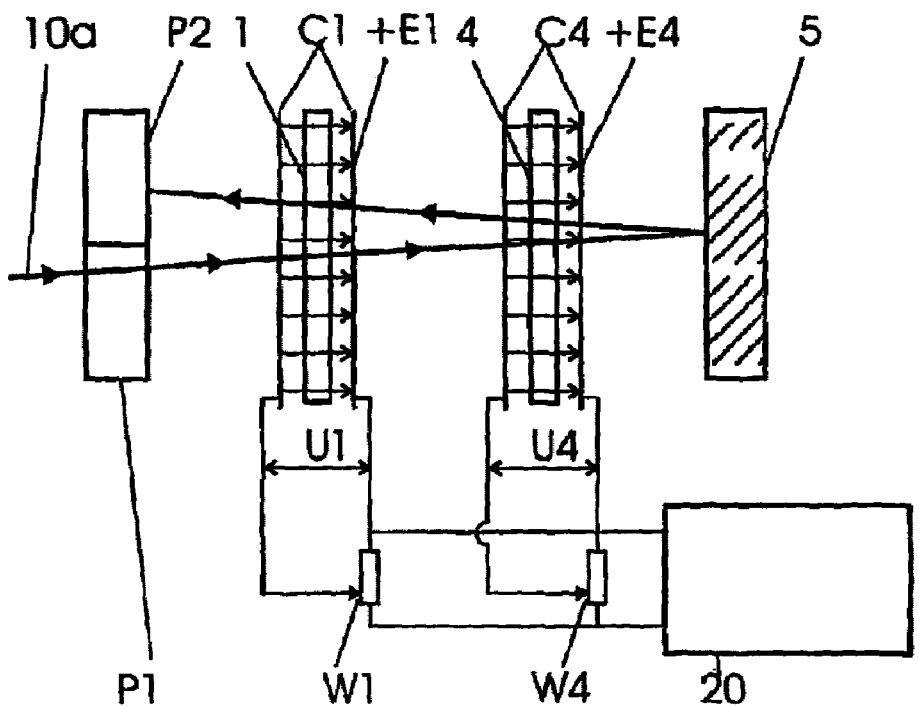
FIG. 4 shows a cross-sectional representation of another specific embodiment of the present invention, inclusive of the electrical wiring and of the electric fields generated by the same.
Figure 5A:
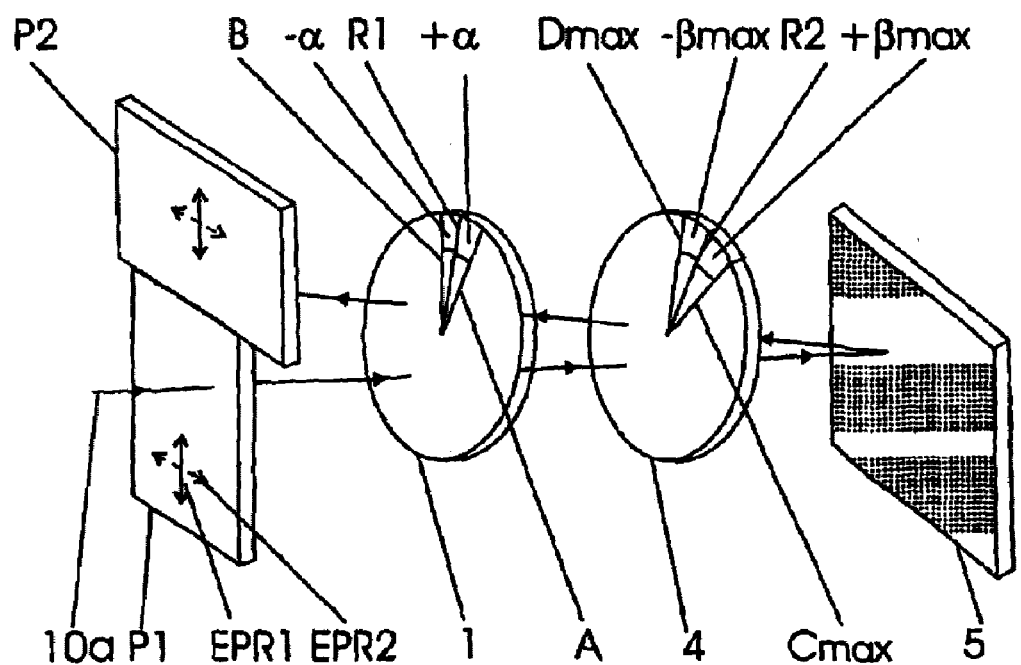
FIG. 5a shows a schematic perspective representation of the device of FIG. 4, onto which a high-intensity beam of light falls, the electrical wiring being omitted.
Figure 5B:
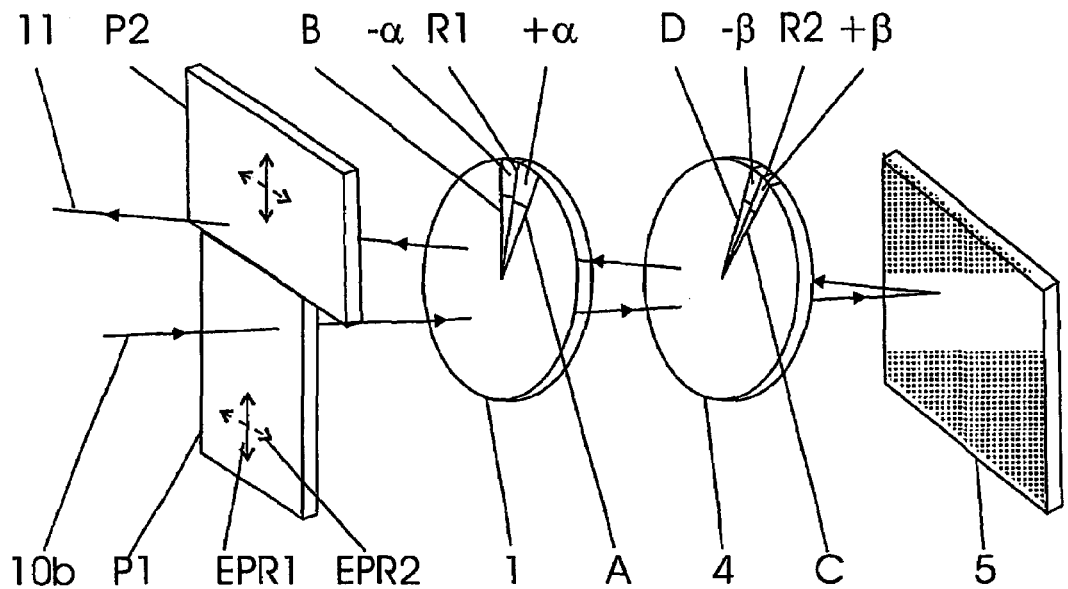
FIG. 5b shows the specific embodiment of FIG. 5a, a low-intensity beam of light being incident.

At this point, reference is made to FIGS. 4, 5a and 5b, which schematically show another specific embodiment of the present invention. A high-intensity light beam 10a (FIGS. 4, 5a) and a low-intensity light beam 10b (FIG. 4b), respectively, strike polarizer P1. The light component transmitted or admitted by this polarizer passes through a first λ/2 phase-retardation plate 1 and a second optically addressable, spatially resolving light modulator 4 designed as a λ/4 phase-retardation plate, and subsequently impinges on a mirror 5, from where the light beam, in reverse order, again propagates through the second light modulator and, after than, first phase-retardation plate 1, and then impinges on analyzer P2 which is crossed with respect to polarizer P1 and is positioned in this specific embodiment of the present invention next to polarizer P1. To enable the light beam to pass geometrically both through polarizer P1, as well as through analyzer P2, its direction of incidence on mirror 5 is not perpendicular to mirror 5; however, the deviation between the direction of incidence of the light beam on mirror 5, from the normal, is selected, to be so slight that the resultant geometric increase in the optical wavelengths in first phase-retardation plate 1 and in second light modulator 4 is negligible.

First λ/2 phase-retardation plate 1 and light modulator 4 are positioned between the plates of plate capacitors C1 and C4, respectively, (FIG. 4), whose plates are formed from light-transmitting, electrically conductive layers. An electric field is generated in each of plate capacitors C1, C4 in response to the application of voltages U1, U4, which are adjustable by potentiometers W1, W4. Voltage source 20 supplies an AC voltage Uo, preferably having a substantially square-wave time characteristic, so that the polarity of voltages U1, U4, and thus also of the electric fields, is continually reversed in plate capacitors C1, C4.

Potentiometers W1, W4 are adjusted in such a way that light modulator 4 in plate capacitor C4 and first λ/2 phase-retardation plate 1 in plate capacitor C1, respectively, are alternately situated in a seventh and in an eighth external electric field +E4, −E4 equal and opposite hereto, and, respectively, in a first and a second external electric field +E1, −E1 equal and opposite hereto. Electric fields +E1, +E4 are cyclically reversed in polarity by AC voltages U1, U4 and, at the same time, into electric fields −E1, −E4 which are equal and opposite thereto, respectively, and vice versa. The situation is illustrated in FIGS. 4 and 5a at an instant when first λ/2 phase-retardation plate 1 is situated in field −E1 and second light modulator 4 in field −E4.

Field strengths −E1, +E1, −E4 and +E4 are selected in such a way, and polarizer P1, first phase-retardation plate 1 and second light modulator 4 are positioned in such a way in accordance with the present invention that conditions (a) and (b) are met.

Second light modulator 4 has a fourth indicatrix, which runs without an external electric field in a second rest-position direction R2, and is rotated by seventh and eighth external electric field +E4, −E4, respectively, out of second rest-position direction R2 into a third or fourth deflection direction C and D, respectively, which is rotated with respect to second first rest-position direction R2 by a third and, respectively, fourth angle +β, −β that is equal and opposite thereto, about the direction of electric field +E2 and −E2, respectively. The magnitude of third and fourth angle +β and −β, respectively, increases in response to increasing light intensity, up to a specific maximum value βmax, not, however, beyond this, so that third and fourth deflection directions C and D reach first and second limiting deflection directions Cmax and Dmax, respectively, in the case that the magnitude of third or fourth angle +β and −β, respectively, reaches maximum value βmax.

FIGS. 5a and 5b show schematic, perspective representations of the device of FIG. 5, the plate capacitors and their electric wiring being omitted for the sake of clarity. Likewise for the sake of clarity, the situations are shown at the same time in FIGS. 5a and 5b, where electric fields +E1, +E4 are applied, and where fields −E1, −E4 having reversed polarity are applied to first phase-retardation plate 1 and to light modulator 4, although these situations do not occur simultaneously, but rather alternating with the frequency of AC voltage Uo (FIG. 5).

In FIG. 5a, light beam 10a of high intensity is incident on polarizer P1. This is oriented in such a way that it only allows one light component having a first input polarization direction EPR1 to pass. This light component propagates through first λ/2 phase-retardation plate 1, depending on the polarity of AC voltage U1 (FIG. 1), there being either no change in the polarization direction or such a change by an angle +4α, as had already been discussed with reference to FIGS. 2a and 2b.

The light subsequently propagates through second light modulator 4, which, in contrast, to first light modulator 2 of FIGS. 1, 2a, 2b, is not designed as a λ/2 phase-retardation plate, but rather as a λ/4 phase-retardation plate. After being reflected at mirror 5, which is associated with a phase jump of 180°, the light propagates through second light modulator 4 again, in the reverse direction. Overall, therefore, second light modulator 4 likewise acts on the polarization direction of the light beam as a λ/2 phase-retardation plate. Due to the high intensity of light beam 10a, depending on the polarity of AC voltage U4 (FIG. 4), the fourth indicatrix runs in first or second limiting deflection direction Cmax or Dmax, so that, a passage of the light beam twice through second light modulator 2 is in no way followed by a change in the polarization direction of the high-intensity light beam.

The light subsequently traverses first phase-retardation plate 1 in the reverse direction. Thus, at the same time, first phase-retardation plate 1 fulfills the function of second phase-retardation plate 2 of FIGS. 1, 2a, 2b. In this connection, analogously to FIG. 2a or 2b, depending on the polarity of AC voltage U1, there is either no change in the polarization direction or such a change by an angle −4α back into the EPR1 direction, so that, in accordance with the present invention, in both cases, high-intensity light is filtered out at the analyzer 2.

In FIG. 5b, low-intensity light beam 10b is incident. Since second light modulator 4 likewise acts on the whole, therefore, as a λ/2 phase-retardation plate on the polarization direction of the light beam, in accordance with the present invention, completely analogously to the situation of FIG. 3, it is achieved that the system (or optical assemblage) of FIG. 5 always allows a very weak light beam 10b to pass through independently of the momentary polarity of AC voltage Uo, the transmission decreasing in response to an increasing angle β, i.e., in response to an increase in the light intensity and, at β=45°, reaching the value zero.

Figure 6:
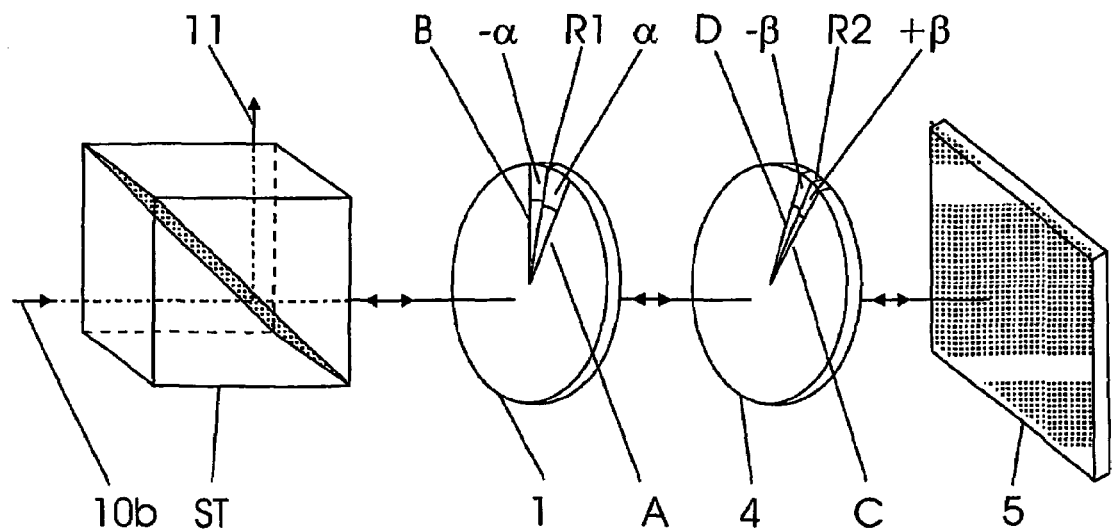
FIG. 6 shows a schematic representation of an embodiment of a device according to the present invention, having a polarizing beam splitter, a low-intensity beam of light being incident thereon, the electrical wiring being omitted.

FIG. 6 shows a schematic representation of another specific embodiment of a device of the present invention, the electrical wiring being omitted. The only difference between this specific embodiment and that of FIGS. 4, 5a, 5b is that polarizer P1 and analyzer P2 of FIGS. 4, 5a, 5b are now jointly formed by a first polarizing beam splitter ST1. Conditions (a) and (b) are also fulfilled in accordance with the present invention. A low-intensity light beam comes from the left into polarizing beam splitter ST1, and one part is transmitted (or allowed to pass through) straight ahead, and one part (not shown) is reflected downwards. The part that is transmitted straight ahead has input polarization direction EPR1. The beam reflected at mirror 5 is incident from the right on polarizing beam splitter ST1. Part of it is transmitted (or allowed to pass through) (not shown), part of it is reflected upwardly as an emergent beam 11, for which the beam splitter acts, at the same time, as an analyzer that is crossed in relation to the EPR1 direction.

Thus, polarizing beam splitter ST1 acts as a polarizer for incident light and, at the same time, as an analyzer that is crossed with respect to the polarizer, for light reflected at mirror 5. This specific embodiment has the advantage over those of FIGS. 4, 5a, 5b that the incident direction of the light beam on mirror 5 may be perpendicular.

Analogously to the explanations regarding FIGS. 1–6, it may easily be shown that, by also using the systems (or optical assemblages) of FIGS. 1–6 for a second input polarization direction EPR2 that is perpendicular to first input polarization direction EPR1 and that is able to be produced, for example, by rotating the polarizer by 90°—the effect of the present invention, namely of complete blocking of the passage of light for high light intensity and of the transmission for low light intensity, is achieved, it also being necessary in this case to rotate analyzer P2 by 90°—characterized in each of FIGS. 2a, 2b, 3, 5a and 5b by a vertical dotted double arrow—so that the condition for an analyzer P2 that is crossed with respect to polarizer P1 is retained.

In addition, one may demonstrate that the effect of the devices of FIGS. 1–6 in accordance with the present invention is also achieved when the value for n in condition (a) is not zero, but rather 1, 2, 3, . . . , thus any natural number at all.

In addition, one may demonstrate that the effect of the devices of FIGS. 1–6 in accordance with the present invention is also achieved when, in condition (b), it is not the case that second deflection direction B and second limiting deflection direction Dmax either both run in parallel to one another or perpendicularly to input polarization direction EPR1, as had been arbitrarily assumed with reference to FIGS. 1–6, but rather when the alternative is realized whereby first deflection direction A and first limiting deflection direction Cmax both run in parallel to one another or perpendicularly to input polarization direction EPR1.

Utilizing tolerance T=±5° in condition (a), it is possible to achieve, when necessary, that the blocking for case β=45° is not complete, but rather a specific fraction of light beam 10a is transmitted.

It is not only possible to use the device of the present invention for preventing integral light intensity under conditions of intense irradiation. The present invention may be employed just as well to filter out or attenuate light which comes from an intensely directed light source and is zonally incident on the device, while a darker background is attenuated to a lesser degree or not at all. Thus, the present invention may be used as a filter to protect the eye from a laser beam, while the background remains viewable through the filter.

The devices of FIGS. 1–6 may be equipped with a lens which images a field-of-view onto first or second light modulator 2, 4, and with an eyepiece which is positioned in such a way as to enable the image of the field-of-view to be observed using the eyepiece. Together with the devices of FIGS. 1–6, the lens and eyepiece then act as a telescope, which, in accordance with the present invention, darkens intensely luminous zones of the field-of-view, while the remaining zones are not darkened at all or are only darkened little. If such a telescope is directed at an intense light source against a darker background, for example at the sun surrounded by blue sky, then the very intense light of the sun is substantially darkened or completely filtered out, while, at the same time, the background is able to be viewed as in a nearly full transmission. Of course, it may be necessary to introduce measures to prevent a too intense local or integral heating of the light modulator, in particular.

Figure 7:
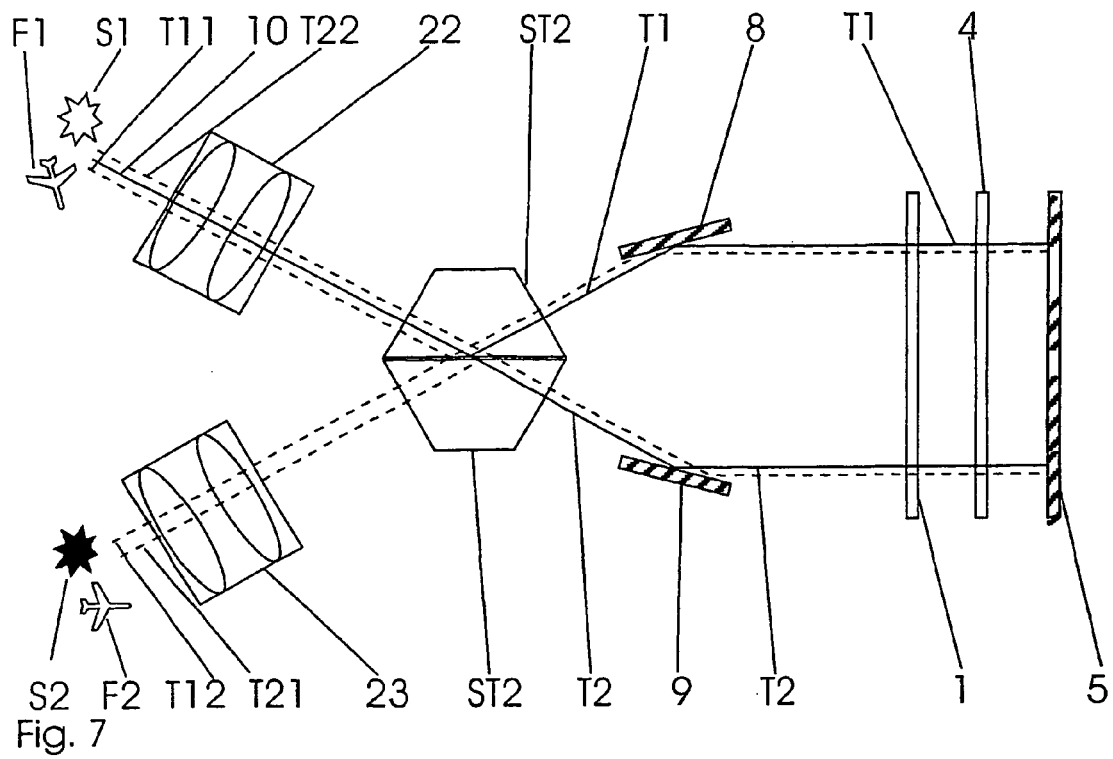
FIG. 7 shows a schematic representation of another specific embodiment of a device according to the present invention, the electrical wiring being omitted.

FIG. 7 shows a cross-sectional representation of one specific embodiment of the present invention, where the need is advantageously eliminated for filtering out one polarization direction in response to the incidence of light on the device. The device of FIG. 7 includes first λ/2 phase-retardation plate 1, second optically addressable, spatially resolving light modulator 4 designed as a λ/4 phase-retardation plate, and mirror 5 of FIG. 4, as well as, additionally, a lens 22, an eyepiece 23, two light-deflecting surfaces 8, 9, which may be mirrors, for example, or mirrored prisms, and a second polarizing beam splitter ST2, which functions as a polarizer for incident light 10 and, at the same time, as an analyzer that is crossed with respect to the polarizer, for light reflected at mirror 5.

In the same way as in FIG. 4, first λ/2 phase-retardation plate 1 or light modulator 4 is situated inside of plate capacitors C1 and C4, respectively, in electric fields, whose polarity is reversed, in synchronous, cyclical fashion from +E1 to −E1 and from +E4 to −E4, respectively, and vice versa, the electric wiring not being shown. Polarizing beam splitter ST2, first phase-retardation plate 1, and the light modulator are positioned in such a way in accordance with the present invention that conditions (a) and (b) are met.

Lens 22 images a field-of-view onto second light modulator 4. The image of the field-of-view is able to be observed using eyepiece 23. From the field-of-view, unpolarized light 10, for example, is incident on the device. In second polarizing beam splitter ST2, this light is divided into two beam components T1, T2, which are linearly polarized perpendicularly to one another, first beam component T1 being deflected and second beam component T2 not being deflected. For example, first beam component T1 may be polarized perpendicularly to the plane of the paper of FIG. 6, and second beam component T2 may be polarized in parallel to the same. First and second beam components T1, T2 are each deflected by one of light-deflecting surfaces 8, 9 in such a way that they pass separately from one another through first $\lambda/2$ phase-retardation plate 1 and second light modulator 4 and strike mirror 5, and, from there, pass again, in reverse order, through second light modulator 4 and first $\lambda/2$ phase-retardation plate 1 and, by way of light-deflecting surfaces 8, 9, back into polarizing beam splitter ST2.

There, first beam component T1 is divided into a third beam component T11, which is linearly polarized in parallel to first beam component T1 and is deflected in polarizing beam splitter ST2 in the direction of lens 23, and into a fourth beam component T12, which is linearly polarized perpendicularly to first beam component T1 and is not deflected in polarizing beam splitter ST2.

After being reflected at mirror 5 and entering once again into beam splitter ST2, second beam component T2 is divided into a fifth beam component T21, which is linearly polarized perpendicularly to second beam component T2 and is deflected in polarizing beam splitter ST2 in the direction of fourth beam component T12, and into a sixth beam component T22 which is linearly polarized in parallel to second beam component T2 and is not deflected in polarizing beam splitter ST.

Second light modulator 4 is situated in the focal plane of lens 22. Since incident light 10 is divided into two independent components T1, T2, which are polarized perpendicularly to one another, two spaced-apart images of the field-of-view are formed on light modulator 4. Eyepiece 23 is positioned in such a way that fourth and fifth beam components T12, T21 arrive at eyepiece 23, so that both images of the field-of-view may be viewed through eyepiece 23, the polarization information of the field-of-view being completely contained in beam components T12, T21. Polarizing beam splitter ST2 is preferably formed and positioned in such a way that the path of fourth beam component T12 coincides with the path of fifth beam component T21, so that, for an observer, both images of the field-of-view are coincident.

When the intensity of incident light 10 is very substantial, in accordance with the present invention, the intensity of the two beam components T12, T21 approaches zero. Accordingly, the device of FIG. 7 functions as a telescope, which advantageously acts at the same time both on the component of incident light 10 that is polarized perpendicularly to the plane of the paper, as well as on the component of incident light 10 that is polarized in parallel to the plane of the paper, in a way that enables only intensely luminous zones of the field-of-view to be darkened, while the remaining zones are not darkened or are darkened only little. It is beneficial that, even when very intense light sources are viewed, beam splitter ST2 is subjected to only little thermal loading since it also divides the light reflected at mirror 5 merely into beam components T11 and T12, respectively, T21 and T22; beam components T11 and T22, which, given a high intensity of incident light 10, in turn, have a high intensity, exiting the device to the outside, through the lens and, thus, substantially contributing to the dissipation of energy out of the device.

This effect according to the present invention is illustrated in, e.g., FIG. 7 by two objects S1, F1 of the field-of-view, S1 emitting light of high intensity and F1 light of low intensity. S1 can be the sun, for example, and F1 an airplane. The observer, for example the pilot of another airplane, who would like to observe airplane F1 against the light of the sun, sees image F2 of airplane F1, darkened only slightly in eyepiece 23, while he sees image S2 of sun S1 advantageously darkened quite substantially, so that the device of the present invention makes it easier, or even possible in the first place, for him to observe airplane F1.

Figure 8:
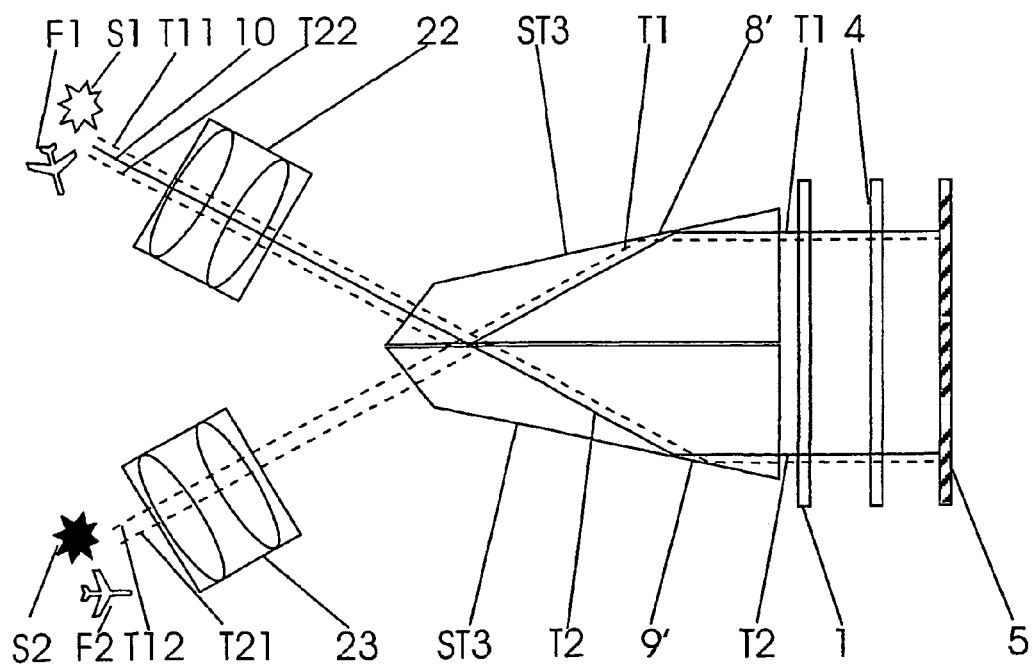
FIG. 8 shows a schematic representation of another specific embodiment of a device according to the present invention, the electrical wiring being omitted.

A variation of the device of FIG. 7 is shown in FIG. 8, where, instead of second polarizing beam splitter ST2 of FIG. 7, a third polarizing beam splitter ST3 is used, which is formed in such a way that two of its bounding surfaces act as light-deflecting surfaces 8', 9', which deflect first and second beam components T1, T2 in the direction of mirror 5, and, once reflected at mirror 5, back into beam splitter ST3. Light deflecting surfaces 8', 9' are preferably externally reflecting.

It is merely for the sake of clarity that beam components T11, T22 and T21, T22 are sketched in such a way in FIGS. 7 and 8 so as to be offset from one another.

Figure 9A:
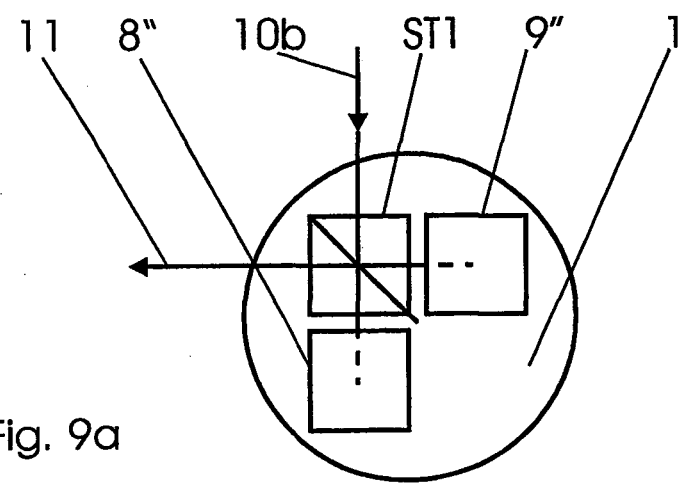
FIG. 9a shows another specific embodiment of a device according to the present invention, the electrical wiring being omitted, viewed in a direction at right angles to the incoming and at right angles to the emergent light beam.
Figure 9B:
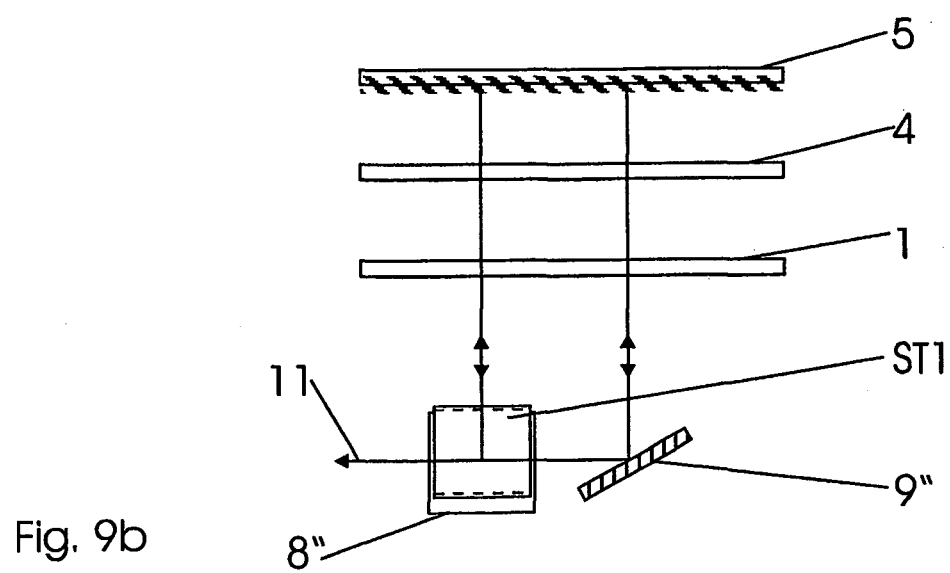
FIG. 9b shows the device of 9a, viewed in the direction of the incident light beam.
Figure 9C:
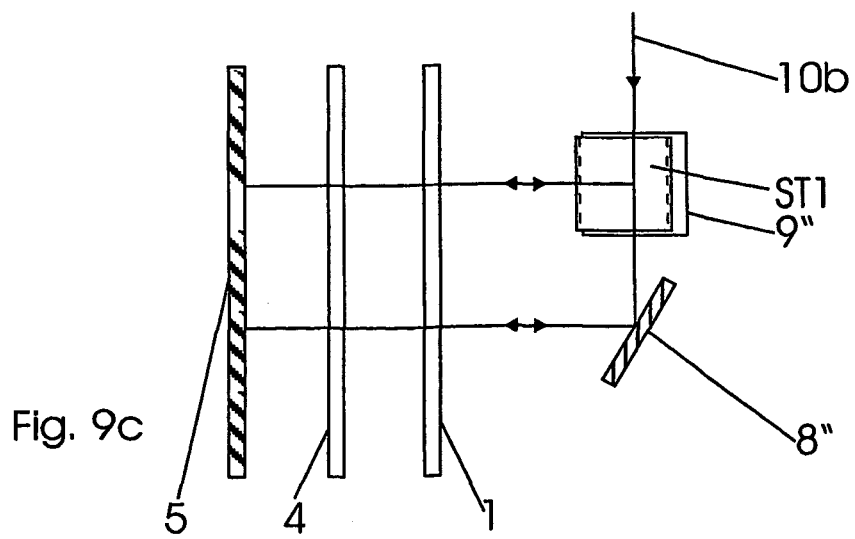
FIG. 9c shows the device of FIG. 9a, viewed in the opposite direction of the emergent light beam.

FIG. 9a shows another specific embodiment of a device according to the present invention, viewed transversely to incoming light beam 10b and transversely to emergent light beam 11, the electrical wiring being omitted. FIG. 9b shows the device of FIG. 9a, viewed in the direction of incident light beam 10b; and FIG. 9c shows this device viewed in the opposite direction of emergent light beam 11.

Polarizing beam splitter ST1 divides incident light 10b into two mutually perpendicular, linearly polarized beam components. They emerge to the right and, respectively, in a downwards direction from beam splitter ST1 in FIG. 9a, and strike light-deflecting surfaces 8''', 9''', respectively, which are each tilted by 45° with respect to the direction of propagation of the beam component in question, in order to deflect the beam components in the direction of phase-retardation plate 1. The mutual configuration of the phase-retardation plate, light modulator 4, and of the mirror, and the configuration of plate capacitors C1, C4 and their electrical wiring correspond to those of FIG. 7. The only distinction is that light-deflecting surfaces 8''', 9''' and polarizing beam splitter ST1 of FIGS. 9a, b, c are positioned differently than light-deflecting surfaces 8, 9 and polarizing beam splitter ST2 of FIG. 7.

The present invention can have industrial applicability, for example, in the area of industrial safety, welding processes, aviation security, pyrotechnics and medical technology.

What is claimed is:

1. An intensity-dependent attenuation device for light, comprising:
   a polarizer which allows linearly polarized light to propagate through in one input polarization direction;
   an analyzer which is crossed relatively thereto by one of a substantial number of degrees and 90 degrees;

a first and a second λ/2 phase-retardation plate and a first optically addressable, spatially resolving light modulator designed as a λ/2 phase-retardation plate, incident light propagating, in turn, through the polarizer, the first λ/2 phase-retardation plate, the first light modulator, and the second λ/2 phase-retardation plate and, from there, impinging on the analyzer, the first λ/2 phase-retardation plate having a first indicatrix which without an external electric field, runs in a first rest-position direction;

in response to the application of a first external electric field, runs in a first deflection direction, which is rotated with respect to the first rest-position direction by a first angle that is independent of the light intensity, about the direction of the first external electric field; and in response to the application of a second external electric field, equal and opposite to the first external electric field, runs in a second deflection direction, which is rotated with respect to the first rest-position direction by a second angle, equal and opposite to the first angle;

the first light modulator having a second indicatrix which, without an external electric field, runs in a second rest-position direction;

in response to the application of a third external electric field, runs in a third deflection direction, which is rotated with respect to the second rest-position direction by a third angle, about the direction of the third external electric field;

in response to the application of a fourth external electric field, equal and opposite to the third external electric field, runs in a fourth deflection direction, which is rotated with respect to the second rest-position direction by a fourth angle, equal and opposite to the third angle;

the magnitude of the third and of the fourth angle increasing in response to increasing light intensity, up to a specific maximum value, not however beyond this, and the third and fourth deflection directions reaching a first and second limiting deflection direction, respectively, in the case that the magnitude of the third or fourth angle reaches maximum value;

the second λ/2 phase-retardation plate having a third indicatrix which, without an external electric field, runs in the first rest-position direction;

in response to the application of a fifth external electric field, runs in the first deflection direction; and in response to the application of a sixth external electric field, equal and opposite to the fifth external electric field, runs in the second deflection direction;

the first and the second phase-retardation plates and the first light modulator being so oriented to one another and with respect to the polarizer that the first deflection direction and the first limiting deflection direction run in parallel to one another and in parallel or perpendicularly to the input polarization direction, or the second deflection direction and the second limiting deflection direction run in parallel to one another and in parallel or perpendicularly to the input polarization direction;

the first or second external electric field being applied to the first phase-retardation plate, the third or fourth external electric field being applied to the first light modulator, and the fifth or sixth external electric field being applied to the second phase-retardation plate; and the first and second, the third and fourth, and the fifth and sixth external electric fields, respectively, being selected in such a way that the first angle and the maximum value fulfill the condition $2\alpha - \beta_{max} = n \cdot 45° + T$, n being equal to 0, 1, 2, 3, ..., $\alpha$ being the first angle, $\beta_{max}$ being the maximum value, and T being a tolerance of $\pm 5°$.

2. The device as recited in claim 1, wherein the first and the second λ/2 phase-retardation plates and the first light modulator are positioned in parallel with one another.

3. The device as recited in claim 1, wherein the first and the second external electric fields, respectively, are generated by a first plate capacitor, between whose plates the first phase-retardation plate is situated; the third and fourth external electric fields, respectively, are generated by a second plate capacitor, between whose plates the first light modulator is situated; and the fifth and sixth external electric fields, respectively, are generated by a third plate capacitor, between whose plates the second phase-retardation plate is situated.

4. The device as recited in claim 3, wherein an AC voltage having a substantially square-wave time characteristic is applied to each of the plate capacitors, the wherein zero crossings of all AC voltages occurring simultaneously.

5. The device as recited in claim 1, further comprising a lens positioned so that the lens is capable of imaging a field-of-view onto the light modulator.

6. The device as recited in claim 5, further comprising an eyepiece positioned to enable the image of the field-of-view to be observed using the eyepiece.

7. The device as recited in claim 1, wherein the light modulator has a liquid-crystal film of chiral smectic-C material, whose molecules have a ferroelectric, deformable helix.

8. The device as recited in claim 1, wherein the first and the second λ/2 phase-retardation plates are identical in design, and the first, second, fifth and sixth electric fields, respectively, each have the same absolute value of electric field strength.

9. A method for attenuating light as a function of intensity, which passes through a polarizer, which allows linearly polarized light to propagate through in one input polarization direction and strike an analyzer that is crossed thereto by a substantial number of degrees or by 90 degrees, wherein the light propagates, in turn, through the polarizer, a first λ/2 phase-retardation plate, a first optically addressable, spatially resolving light modulator designed as a λ/2 phase-retardation plate, and a second λ/2 phase-retardation plate, and, from there, impinging on the analyzer, the first λ/2 phase-retardation plate having a first indicatrix which runs without an external electric field in a first rest-position direction;

in response to the application of a first external electric field, runs in a first deflection direction, which is rotated with respect to the first rest-position direction by a first angle that is independent of the light intensity, about the direction of the first external electric field; and in response to the application of a second external electric field, equal and opposite to the first external electric field, runs in a second deflection direction, which is rotated with respect to the first rest-position direction by a second angle, equal and opposite to the first angle;

the first light modulator having a second indicatrix which, without an external electric field, runs in a second rest-position direction;

in response to the application of a third external electric field, runs in a third deflection direction, which is rotated with respect to the second rest-position direction by a third angle, about the direction of the third external electric field;

in response to the application of a fourth external electric field, equal and opposite to the third external electric field, runs in a fourth deflection direction, which is rotated with respect to the second rest-position direction by a fourth angle, equal and opposite to the third angle;

the magnitude of the third and of the fourth angle increasing in response to increasing light intensity, up to a specific maximum value, not beyond this, and the third and fourth deflection directions reaching a first and second limiting deflection direction, respectively, in the case that the magnitude of the third or fourth angle reaches the maximum value;

the second λ/2 phase-retardation plate having a third indicatrix which, without an external electric field, runs in the first rest-position direction;

in response to the application of a fifth external electric field, runs in the first deflection direction; and in response to the application of an external sixth electric field, equal and opposite to the fifth external electric field, runs in the second deflection direction;

the first and the second phase-retardation plates and the first light modulator being so oriented to one another and with respect to the polarizer that the first deflection direction and the first limiting deflection direction run in parallel to one another and in parallel or perpendicularly to the input polarization direction, or the second deflection direction and the second limiting deflection direction run in parallel to one another and in parallel or perpendicularly to the input polarization direction;

the first or second external electric field being applied to the first phase-retardation plate, the third or fourth external electric field being applied to the first light modulator, and the fifth or sixth external electric field being applied to the second phase-retardation plate; and the first and second, the third and fourth, and the fifth and sixth external electric fields, respectively, being selected in such a way that the first angle and the maximum value fulfill the condition $2\alpha - \beta max = n \cdot 45° + T$, n being equal to $0, 1, 2, 3, \ldots$, $\alpha$ being the first angle, $\beta max$ being the maximum value, and T being a tolerance of $\pm 5°$.

10. The method as recited in claim 9, wherein the first and the second external electric fields, respectively, are generated by a first plate capacitor, between whose plates the first phase-retardation plate is situated; the third and fourth external electric fields, respectively, are generated by a second plate capacitor, between whose plates the first light modulator is situated; and the fifth and sixth external electric fields, respectively, are generated by a third plate capacitor, between whose plates the second phase-retardation plate is situated.

11. The method as recited in claim 10, wherein an AC voltage having a substantially square-wave time characteristic is applied to each of the plate capacitors, wherein zero crossings of all the a.c. voltages occurring simultaneously.

12. The method as recited in claim 9, wherein a lens images a field-of-view onto the light modulator.

13. The device as recited in claim 12, wherein an eyepiece is positioned in such a way as to enable the image of the field-of-view to be observed using the eyepiece.

14. The device as recited in claim 9, wherein the first and the second λ/2 phase-retardation plates are identical in design, and the first, second, fifth and sixth electric fields, respectively, each have the same absolute value of the electric field strength.

15. The device as recited in claim 3, wherein the plates of the plate capacitors are constituted of electrically conductive layers which are at least partially reflecting to light and which are directly placed on the light-transit surfaces of the phase-retardation plates or of the light modulators, or are placed at a distance, in parallel to the same, using a transparent substrate material.

16. The device as recited in claim 4, wherein the AC voltages originate from a shared voltage source.

17. The method as recited in claim 11, wherein the AC voltages originate from a shared voltage source.

* * * * *